United States Patent [19]

Schumacher, Jr. et al.

[11] 4,158,973
[45] Jun. 26, 1979

[54] ROLLING CUTTER DRILL BIT

[75] Inventors: Percy W. Schumacher, Jr.; James A. Minton, Jr.; Frank A. Hollingshead, all of Houston, Tex.

[73] Assignee: Reed Tool Company, Houston, Tex.

[21] Appl. No.: 886,983

[22] Filed: Mar. 15, 1978

[51] Int. Cl.² ............................................. B21K 5/02
[52] U.S. Cl. .................................................. 76/108 A
[58] Field of Search ............. 76/108 R, 108 A, 101 R

[56] References Cited

U.S. PATENT DOCUMENTS

| | | | |
|---|---|---|---|
| 2,171,058 | 8/1939 | Crum | 76/108 A |
| 3,850,256 | 11/1974 | McQueen | 76/108 A |
| 3,907,191 | 9/1975 | Lichte | 76/108 A |

FOREIGN PATENT DOCUMENTS 34-9051  6/1959  Japan ...................... 76/108 A

Primary Examiner—Harold D. Whitehead
Assistant Examiner—Roscoe V. Parker
Attorney, Agent, or Firm—Michael J. Caddell

[57] ABSTRACT

A rolling cutter drill bit is disclosed which utilizes a main body having a threaded end for connection in a drill string, and a plurality of rolling cutter assemblies joined to the bottom of the bit body by means such as electron beam welding.

2 Claims, 4 Drawing Figures

ROLLING CUTTER DRILL BIT

BACKGROUND OF THE INVENTION

The present invention involves drilling bits and more specifically involves a rolling cutter drill bit comprising a bit body threaded for connection to a drill string and having a lower machined surface for receiving one or more rolling cutter assemblies which are affixed thereto by means such as electron beam welding.

The conventional drill bits in use today generally comprise three similar lug sections each having an integral bearing shaft projecting downwardly at an angle therefrom. The three lug sections have bearing surfaces machined on the shafts for receiving rolling cutter assemblies. After machining operations are completed on the bearing shafts, the three lugs are placed in a welding fixture and welded longitudinally to form a single drill bit structure. Afterwards, the upper end of the joined structure is threaded for engagement in a drill string connector. Rolling cutters are located on the bearing shafts with appropriate bearings located therein.

Prior to assembling the multiple lug sections of the prior art devices a required number of complex machining and hardening procedures must be applied to each lug in order that the necessary close tolerances in the bearing structures be achieved. These operations generally include accurately securing each lug in a grinding fixture and machining bearing surfaces thereon to extremely tight specifications having very close tolerances. The bearing shaft extending downwardly at an angle from each lug must be machined in multiple steps because of the varied number of bearing surfaces on the shaft.

Due to the length and awkward shape of each lug, the grinding procedures for forming the particular bearing surfaces are complex and difficult. Because of the concentric nature of the bearing surfaces on the main radial bearing portion of the journal and the pilot pin portion of the journal, very close tolerances must be maintained to reduce eccentricities between these two bearing surfaces. This is difficult to achieve and very expensive, partially because of the large awkward shape of the lug on which the machining operations are performed.

After machining the various bearing surfaces on each of three different lugs, the lugs must then be aligned properly to achieve the desired gage, which refers to the effective cutting diameter of the bit, then the three lugs are combined into a single drill bit structure by welding their common abutting edges together. The bit must then be machined to form threads at the upper end for connection to the drill string and this operation must also be very accurate to provide proper alignment and rotation of the cutters and the drill bit with respect to the rotational axis of the drill string.

A further disadvantage of the prior art bit construction is that, in addition to extensive hardening and heat treating, stronger and tougher alloys must sometimes be utilized in the construction of the bearing area on the bit lugs. Unfortunately, because the lugs are shaped in integral sections, these expensive alloys have to be used throughout the entire lug structure. Because of the prohibitive expense of many desirable alloys, they cannot be used in the prior art devices.

Another distinct disadvantage in the prior art devices is that the gage of the finished drill bit is difficult to maintain within specified tolerances because of their methods of construction. Likewise, each different size of drill bit requires entirely different sized and shaped lugs. Therefore, an 8½ inch nominal bit requires a different lug than an 8¾ inch nominal bit. Also, achieving the actual desired effective cutting diameter is difficult because of the inaccuracy of welding the forged lug members into a single bit structure.

Other prior art devices utilize a welded structure wherein the entire lug is formed in a normal manner but without a bearing shaft projection thereon. Consequently, a cylindrical opening is machined through the downward end of the lug for receiving a separate bearing shaft which may then be pressed in place and/or welded. While this device may offer some advantages over the normal single piece lug construction of the other prior art devices, it does not offer the benefits of the present invention wherein the gage dimension may be accurately controlled to very tight tolerances and may even be varied within certain ranges to obtain a different size bit utilizing the same structural components. Likewise, the main body cannot be made in a single section but must be welded from three sections as in the other prior art bits. An example of the prior art device utilizing a pressed-in bearing shaft is disclosed in U.S. Pat. No. 4,043,411.

The present invention overcomes all of these disadvantages by providing a drill bit construction utilizing a single upper bit body which may be manufactured in a single section and which has a lower machined abutment surface generally normal to the central rotational axis of the drill bit. To this machined abutment surface a plurality of extension lugs having matching machined surfaces on the top thereof and rolling cutters mounted thereon are attached by means such as welding.

Each extension lug has a downwardly and inwardly extending bearing shaft on which are located machined radial and axial bearing surfaces. The machined abutment surfaces on the extension lugs are arranged so that they are generally normal to the axis of rotation of the drill bit. Location of each extension lug in its proper position along the bit body may be achieved by using location dowels set into recesses in the surface of the bit body and adapted to engage matching dowel recesses machined in the abutment surface of each extension lug.

Thus, the drill bit of this invention may utilize a single upper bit body which can be cast or machined according to conventional techniques from an inexpensive suitable metal such as cast iron, steel, or other inexpensive alloy. The smaller, more compact extension lugs may be formed of a more exotic, wear resistant material of a more expensive alloy.

The present invention is also advantageous in that the effective cutting diameter or gage can be more easily controlled by controlling the location of the compact extension lugs on the abutment surface of the bit body. Likewise, a standardization of manufacturing products can be accomplished by the use of single size bit bodies for varying size bits by sliding the extension lugs radially inward and outward before welding to obtain the differing gage sizes.

Furthermore, the present invention is advantageous in that the machining of bearing surfaces on the bearing shafts projecting from the extension lugs is accomplished far easier because of the small size and regular shape of the extension lugs. Thus, the present invention reduces the extensive machining and metal hardening requirements of the prior art devices, eliminates the need for three large lugs to be joined into a single drill bit body, and allows the use of more exotic alloys in the

DESCRIPTION OF THE PREFERRED EMBODIMENTS

Figure 1:
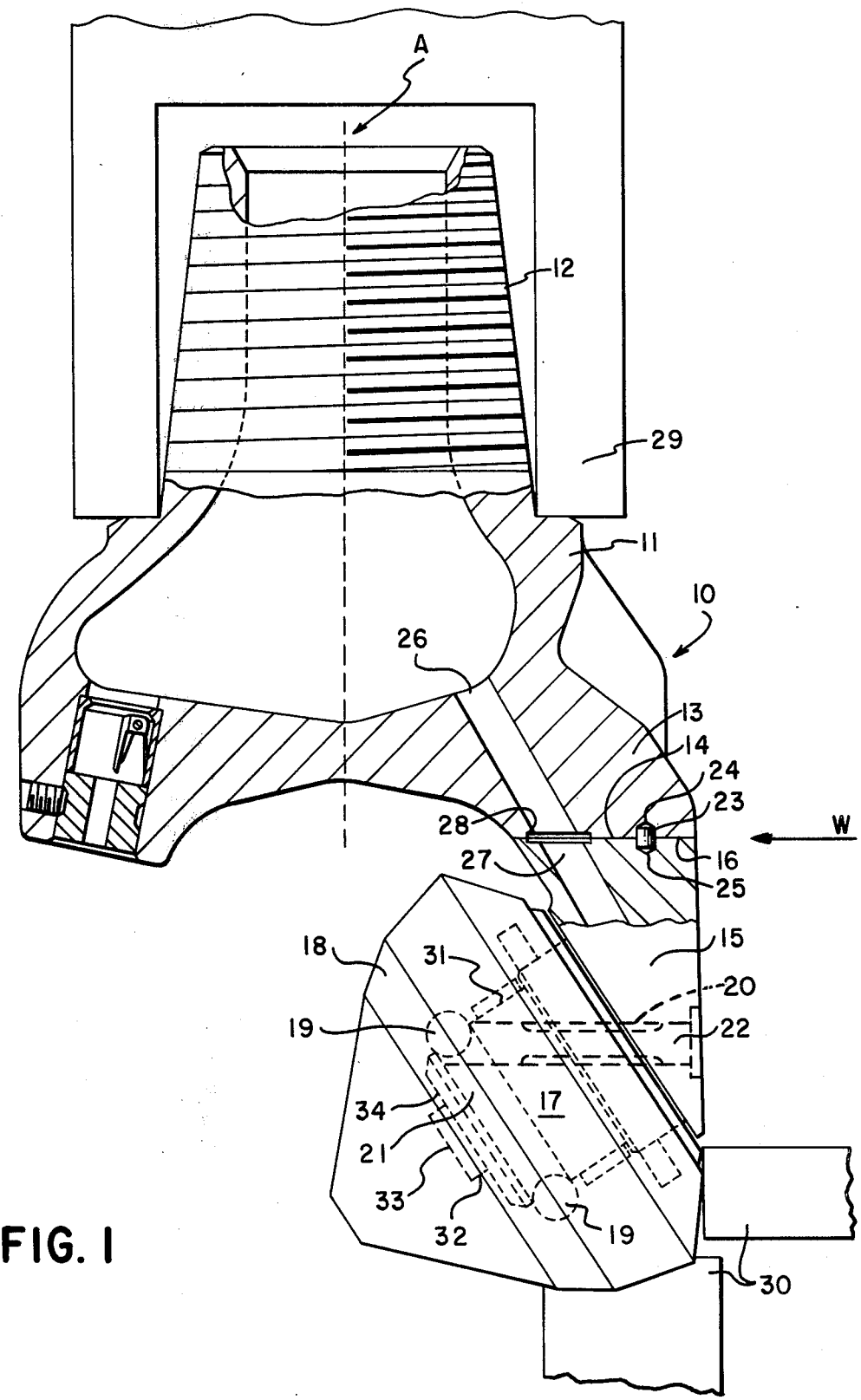
FIG. 1 is a longitudinal cross section of a drilling bit of the present invention.

Referring now to FIG. 1, a drill bit according to the present invention is disclosed in cross-sectional schematic illustration. In the figure, a drill bit 10 comprises an upper body section 11 having external male threads 12 formed at the top thereof. The body 11 has one or more downwardly extending lug sections 13 characterized by a flat bottom surface 14 formed substantially normal to the central rotational axis A of drill bit 10. To each of the downwardly facing surfaces 14 is attached a mating surface 16 of a lug extension member 15.

The extension lug 15 has a downward and inwardly sloping bearing journal shaft 17 formed thereon as illustrated in phantom on the drawing. A rolling cutter 18 of the conventional construction is rotatably secured to bearing shaft 17 by means such as ball bearings 19. The ball bearings 19 are inserted through a bore passage 20 formed in extension lug 15 to secure the cutter 18 on shaft 17. After the proper number of ball bearings 19 have been loaded into race 21 on the shaft, a retention pin 22 is secured in the passage 20 by means such as welding to prevent loss of the ball bearings from their retention position between the shaft and the cutter.

The lug extension 15 has an upper surface 16 machined to substantially match downwardly facing surface 14 and make full surface contact therewith. A plurality of interlocking dowel pins 23 fit into alignment recesses 24 and 25 machined in the lug sections 13 and lug extensions 15 to provide proper alignment of the lug extensions and rolling cutters on the bit body. This alignment assures that the fluid channel 26 in the lug sections 13 is in substantial alignment with lower passage 27 in the extension lug 15.

Undercut areas 28 are machined in the surfaces 14 and 16 larger than the fluid passages to prevent weld material from interfering with the flow of fluid through the passages. The enlarged undercut area 28 is large enough to retain any excessive weld or flux which might normally partially block passages 26 and 27.

After the lug extensions 15 are located in their proper orientation on the lug sections 14 by means of location dowels 23, the body 11 is clamped in position by an upper fixture 29 and each of the cutter assemblies are held in position by lower fixtures 30. A welding operation is then performed as indicated by the symbolic arrow labeled W to secure the lug extension to the upper lug section by joining surfaces 14 and 16 permanently together. One preferable means of attaching the two surfaces permanently is through the process of electron beam welding which results in a sound, tough weld without affecting existing heat treated portions of the bit as would normally occur using conventional welding methods.

Thus it can be seen from the invention illustrated in FIG. 1 that a central bit body 11 can be manufactured from economical metal alloys using conventional manufacturing techniques in a single integral section or alternatively could be formed in two half sections and welded into a single body. Either method of forming body 11 is substantially easier and more accurate than that now used in conventional drill bit manufacturing techniques wherein three arcuate lug sections must be welded into a single bit structure.

After formation of the main bit body, the abutment surfaces on the lower lug sections 13 are machined normal to the central axis A and the various number of required cutting assemblies comprising a rolling cutter and a lug extension with bearing shaft are attached to the bit body at surface 14 by means such as welding. The small, generally regular shape of the lug extensions 15 greatly reduces the difficulty in machining the bearing surfaces on the bearing shaft 17.

These surfaces generally comprise the main radial bearing surface 32, and thrust surfaces 33 and 34. Because of the undesirable eccentricities arising during machining operations between these bearing surfaces, it is very desirable to simplify the machining operation as much as possible. This is achieved by reducing the mass and bulk of the piece on which machining is performed. Performing the machining operations on the small extension lug 15 as opposed to the entire lug element in the prior art devices greatly simplifies and eases the burden of the machining operations.

Figure 2A:
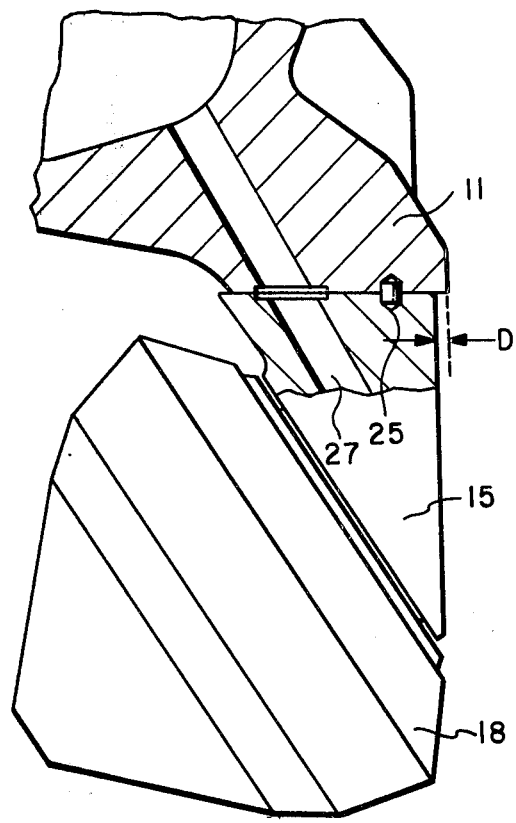
FIGS. 2a and 2b are cross sectional representations of the lower portion of the bit of FIG. 1 showing the adjustment of the lower extension lug to achieve various gage dimensions.
Figure 2B:
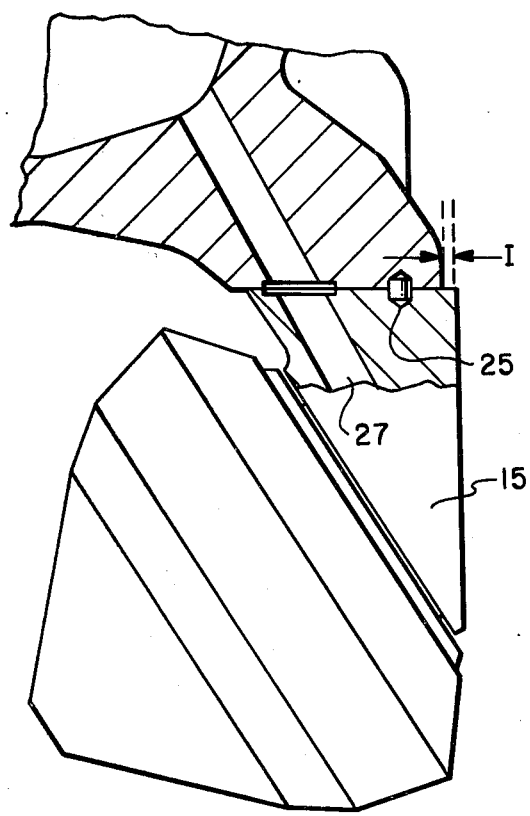

FIGS. 2a and 2b illustrate how the cutting diameter of the bit may be varied by simple modifications in the extension lugs. Thus drill bits of different nominal gage sizes may be constructed from the same elements. The same drill body for instance may be used with the same extension lugs and rolling cutters to obtain a gage dimension a quarter inch smaller or larger than the specified gage shown in FIG. 1.

In FIG. 2a a smaller gage is obtained by shifting the lug extension 15 radially inward by a distance D. This is accomplished by offsetting the locations of passage 27 and recess 25 to obtain the radial displacement D. Likewise in FIG. 2b an increase in gage dimension I is achieved by radially offsetting the cutter assembly 15 by an amount I. This is achieved in the same manner as in FIG. 2a except that the radial offset of passage 27 and recess 25 is in the opposite radial direction in an amount equivalent to I. Thus, in FIG. 2a, the gage dimension is reduced by an amount equivalent to about twice the offset D and in FIG. 2b the gage diameter is increased by an amount equivalent to about two times the offset I.

Figure 3:
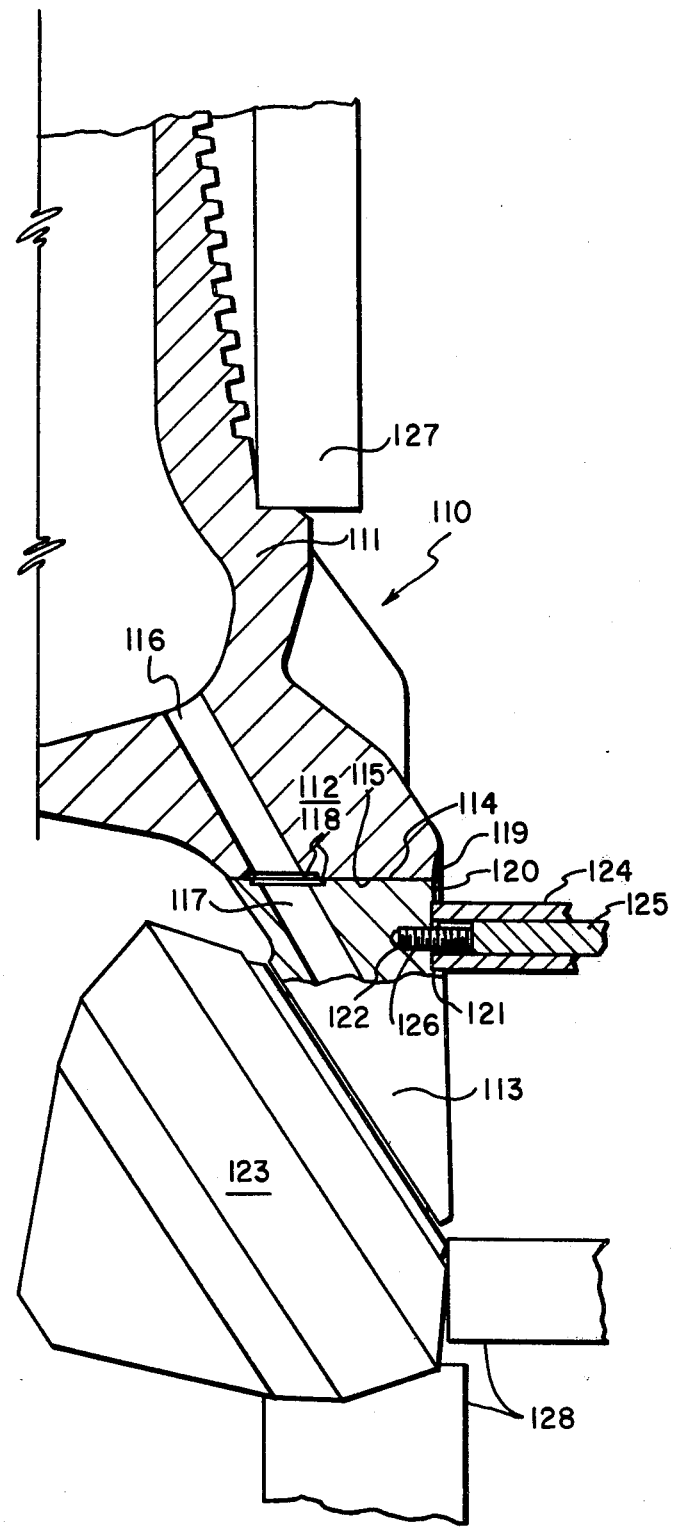
FIG. 3 is a cross sectional illustration of the structure and method of assembling an alternate embodiment of a drill bit according to the present invention.

Referring now to FIG. 3, a different embodiment of the invention is disclosed in which a rolling cutter drill bit 110 has an upper body unit 111 with downward extending lug sections 112 formed integrally along the lower portion of body 111. Lug sections 112 have lower machined surfaces 114 for receiving a lug extension 113. Lug extension 113 has an upper machined surface 115 for abutment and substantially full face contact with surface 114.

A lubricant or coolant passage 116 extends downwardly through lug section 112 and is coaxially aligned with a similar passage 117 formed in lug extension 113. Undercut enlarged sections 118 formed around passages 116 and 117 in surfaces 114 and 115 provide recessed areas for trapping excess weld material which could block the lubricant and coolant in passages 116 and 117.

A milled slot 119 is formed in lug sections 112 and arranged to align with a similar milled slot 120 formed in the lug extension 113. Directly below slot 120 is a circular recess 121 machined into the lug extension 113 and a threaded internal bore 122 generally centrally located in recess 121. A hollow gage alignment bar 124 is arranged for engagement in circular recess 121 in relatively snug fitting relationship therein. A sliding gage rod 125 is located in close fitting slidable relationship in hollow bar 124. A threaded bolt member 122 is secured to the end of rod 125 and has external threads thereon matching the internal threads in threaded hole 122.

Preferably alignment bar 124 is held in rigid relationship with the upper fixture 127 clamping the bit body 111 in a stationary position. Alignment bar 124 is thus stationed such that moving lug extension 113 into abutment with bar 124 until the bar is seated in recess 121 provides a positive alignment system for obtaining a bit gage diameter extremely close to the specified effective cutting diameter for the bit. This alignment is achieved by threading bolt member 126 into threaded recess 122 and pulling radially outward on gage rod 125 until the recessed area 121 seats around alignment bar 124. At this point the welding machine operator is secure in the knowledge that the extension lug is properly located on the lug section of the body and the welding step may be performed to permanently affix the two sections together.

Alternatively, a different alignment system may be utilized wherein an alignment ring can be located in the fixtures 30 and 128 to provide radial and gage alignment of the cutter assemblies when they are in contact with the alignment ring. In this situation the alignment bar would not need to contact the lug extension 113 nor would there be a need for a recessed area 121. Instead the rod 125 would be moved radially outward in bar 124 until the cutter assembly contacts the gage ring in the welding jig 128.

Normally, the welding operation, consisting of electron beam welding, is sufficient to strongly yet quickly attach the lug extension to the lug section. After the welding operation has been completed, the threaded rod 125 is rotated out of recess 122 and the clamping fixture comprising bar 124, upper clamp 127, and lower clamp 128 is loosened and the finished drill bit is removed from the clamping fixture.

It should be noted that prior to the welding operation the extension lug 113 has undergone the requisite machining operations to obtain the previously mentioned radial and axial thrust bearing surfaces. Likewise the cutting assembly, comprising a conventional rolling cutter 123 and associated bearing assemblies, is located on lug extension 113 and secured thereon by conventional means. By the use of the sliding rod arrangement 125, the need for alignment dowels has been eliminated and a system for providing extremely accurate gage alignment and holding this alignment during the welding operation is hereby disclosed.

As in the previously mentioned embodiment a change in the nominal gage dimension may be achieved with this embodiment by a radial displacement of the extension lug 113 radially inward or outward a predetermined distance to obtain the different gage width. This may be achieved using the same bit body and extension lugs as utilized in the standard gage dimension as illustrated in FIG. 3.

Thus the present invention discloses means for fabricating a rolling cutter drill bit utilizing an easily manufactured drill body of conventional low cost metals and of forming the bearing shaft section of the lug in a smaller more easily machined piece which can be made of a tougher more expensive alloy and be more easily hardened and heat treated and then adjoined to the bit body by means such as electron beam welding. The present invention also discloses means for varying the gage dimension of the standard drill bit while still utilizing the same basic structural components as the normal gage bit.

Although certain preferred embodiments of the present invention have been herein described in order to provide an understanding of the general principles of the invention, it will be appreciated that various changes and innovations can be effected in the described drill bit structure without departure from these principles. For example, whereas the present method of construction utilizes electron beam welding, it is clear that other types of welding and methods of joining the two surfaces together can be utilized. For instance, flash welding and conventional welding techniques could be substituted for the electron beam welding. In addition, where the abutment surfaces between the bit body and lug extensions are disclosed and illustrated as being flat, it is clear that they could be of varied complementary configurations such as concave and convex, angular, faceted, etc. Also, instead of cylindrical alignment pins, other types of alignment projections could be used on one of the surfaces such as shoulders or ridges with matching channels in the opposite surface. Elongated or circular keys and keyways could also be substituted for the pins. Thus all modifications and changes of this type are deemed to be embraced by the spirit and scope of the invention except as the same may be necessarily limited by the appended claims or reasonable equivalents thereof.

The embodiments of the invention in which an exclusive property or privilege is claimed are defined as follows:

1. A method for manufacturing a rolling cutter drill bit, said method comprising the steps of:
   forming a generally rounded, partially hollow bit body having an upper threaded end and a central axis of rotation;
   forming an abutment surface on the lower end of said body;
   forming one or more short lug extensions, each having an extended bearing shaft at one end thereon;
   forming an abutment surface on each lug extension on the end opposite said bearing shaft, said lug extension abutment surface generally adapted to make surface contact with said body abutment surface;
   forming bearing surfaces on said bearing shaft for receiving rotatable bearing means;
   locating a rolling cutter and bearing means in rotatable relationship on each lug extension bearing shaft and securing said cutter and bearing means thereon; abutting each said lug extension abutment surface with said body abutment surface and aligning said lug extensions in a predetermined radial alignment thereon;
   clamping said lug extensions and body tightly together;

securedly attaching each said lug extension to said body at said abutment surface; and, wherein said aligning step further comprises:

forming threaded recess means in the exterior wall of each lug extension;

engaging a threaded sliding rod in said recess means, said sliding rod being slidably mounted in a fixed alignment frame; and moving said sliding rod, with said lug extension attached thereto, in said frame until a predetermined position of said rod is attained, thereby locating said lug extension in a desired position on said body.

2. A method of manufacturing rolling cutter drill bits having varying effective cutting diameters within a prespecified range of diameters, using the same components for any diameter within said prespecified range, said manufacturing method comprising:

forming a substantially rounded bit body having a generally centrally located axis of rotation;

forming a threaded end portion on said body for connection into the threaded end of a drill pipe connector;

forming a flat attachment surface on the opposite end of said body substantially normal to said axis of rotation;

forming one or more relatively short lug extensions having a cylindrical bearing shaft near one end and a flat attachment surface at the other end, said attachment surface on the lug extensions being substantially parallel to the effective cutting diameter of the drill bit;

machining bearing surfaces on said bearing shaft;

locating bearing means on said bearing surfaces and a rolling cutter over said bearing surfaces on each lug extension;

axially positioning said lug extensions with their attachment surfaces contacting the bit body attachment surface;

moving said lug extensions radially to obtain a bit effective cutting diameter within the prespecified range; and securing said lug extensions to said body bit at said attachment surfaces.

* * * * *